United States Patent [19]
Aoshima et al.

[11] Patent Number: 5,121,404
[45] Date of Patent: Jun. 9, 1992

[54] OPTICALLY PUMPED SOLID LASER

[75] Inventors: Shinichiro Aoshima; Kenshi Fukumitsu, both of Shizuoka, Japan

[73] Assignee: Hamamatsu Photonics K.K., Shizuoka, Japan

[21] Appl. No.: 701,342

[22] Filed: May 9, 1991

Related U.S. Application Data

[63] Continuation of Ser. No. 430,638, Nov. 1, 1989, abandoned.

[30] Foreign Application Priority Data

Nov. 16, 1988 [JP] Japan .................. 63-289842

[51] Int. Cl.$^5$ .......................... H01S 3/091
[52] U.S. Cl. ........................ 372/75; 372/22; 372/70; 372/71; 372/93; 372/99; 372/100
[58] Field of Search ............. 372/66, 22, 49, 71, 372/75, 93, 99, 100, 69, 70; 385/14, 36

[56] References Cited

U.S. PATENT DOCUMENTS

| | | | |
|---|---|---|---|
| 3,248,671 | 4/1966 | Dill et al. | 372/93 |
| 3,289,099 | 11/1966 | Masters | 372/95 X |
| 3,289,101 | 11/1966 | Masters et al. | 372/95 X |
| 3,383,621 | 5/1968 | Luck, Jr. et al. | 331/94.5 |
| 3,602,724 | 8/1971 | Smith | 372/22 |
| 3,617,930 | 11/1971 | Snitzer et al. | 372/20 |
| 3,624,545 | 11/1971 | Ross | 372/75 |
| 4,050,035 | 9/1977 | Wuerker et al. | 372/93 |
| 4,468,778 | 8/1984 | Karning et al. | 371/108 |
| 4,672,616 | 6/1987 | Trost et al. | 372/22 |
| 4,710,940 | 12/1987 | Slipes, Jr. | 372/75 |
| 4,731,795 | 3/1988 | Clark et al. | 372/107 |
| 4,739,507 | 4/1988 | Byer et al. | 372/22 |
| 4,747,111 | 5/1988 | Trutna, Jr. et al. | 372/94 |
| 4,749,842 | 6/1988 | Kane et al. | 219/201 |
| 4,809,291 | 2/1989 | Byer et al. | 372/75 |
| 4,847,851 | 7/1989 | Dixon | 372/75 |
| 4,852,961 | 8/1989 | Yamamoto et al. | 350/96.19 |
| 4,885,752 | 12/1989 | Chien et al. | 372/33 |
| 4,890,289 | 12/1989 | Basu et al. | 372/33 |
| 4,891,820 | 1/1990 | Rando et al. | 372/93 |

FOREIGN PATENT DOCUMENTS

| | | |
|---|---|---|
| 60-140889 | 7/1985 | Japan . |
| 62-189783 | 8/1987 | Japan . |
| 63-27079 | 2/1988 | Japan . |
| 63-27080 | 2/1988 | Japan . |
| 1053166 | 12/1966 | United Kingdom . |

OTHER PUBLICATIONS

Karube et al. "Alignment Characteristics of an . . . " Jap. Journal App. Phys. vol. 6(3) Mar. 1967 p. 364.

N. G. Basov, et al., "Energy Parameters of a Large-Aperture Prism Active Mirror", Soviet Journal of Quantum Electronics, vol. 18, No. 10, (Oct. 1988), New York, U.S., pp. 1309-1310.

T. Y. Fan et al., "Diode Laser-Pumped Solid-State Lasers," IEEE Journal of Quantum Electronics, vol. 24, No. 6, Jun. 1988, pp. 895-912.

*Primary Examiner*—Georgia Y. Epps
*Attorney, Agent, or Firm*—Finnegan, Henderson, Farabow, Garrett and Dunner

[57] ABSTRACT

An optically pumped solid laser that uses a corner cube or rectangular prism as its solid laser medium, containing end faces through which a semiconductor pumping light beam is applied to the medium. The solid laser medium contains at least one kind of coating formed on at least a part of an end face, such that the end face acts as a resonator and/or output mirror. Optical fibers may be connected to the end faces for inputting or outputting light beams. Non-linear crystals in waveguide form may be coupled to the outputting end face of the medium, specifically crystals of either SHG, THG, FHG, or parameteric; and KTP, $\beta$-BaB$_2$O$_4$, KNbP$_3$, or MgO doped LiNbO$_3$.

8 Claims, 7 Drawing Sheets

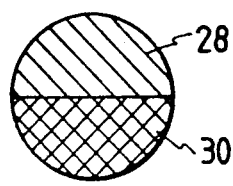
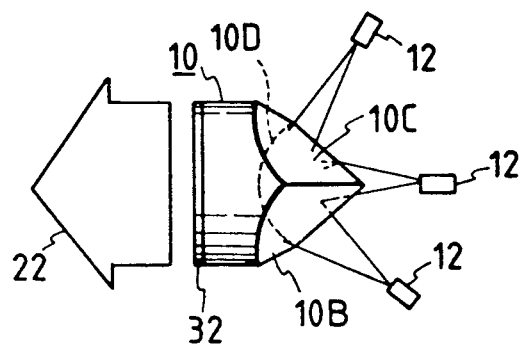
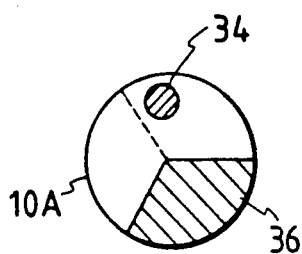
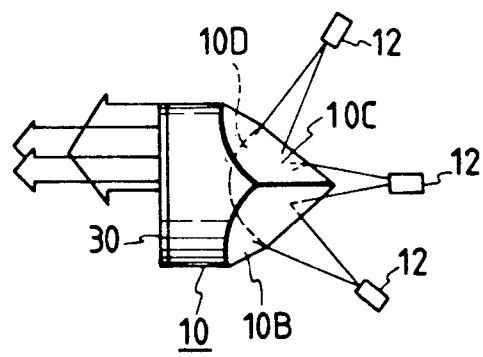
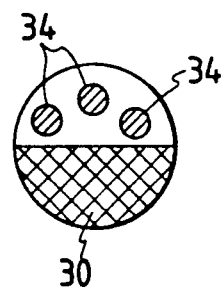
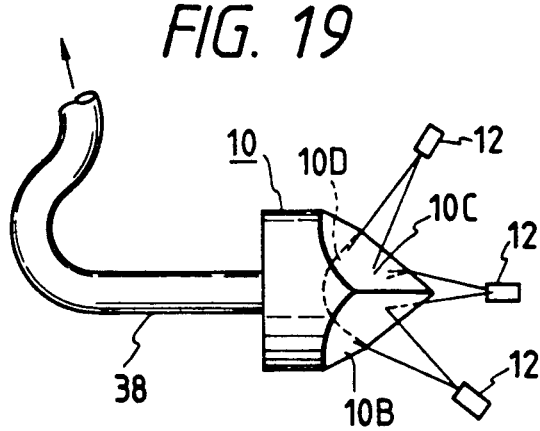
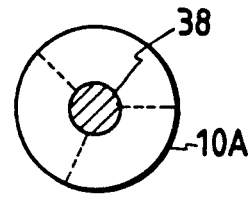

OPTICALLY PUMPED SOLID LASER

This application is a continuation of application Ser. No. 07/430,638, filed Nov. 1, 1989, now abandoned.

BACKGROUND OF THE INVENTION

1. Field of the Invention

The present invention relates to an optically pumped solid laser.

2. Description of the Prior Art

Prior art examples of optically pumped solid lasers utilize a xenon lamp, a krypton lamp, or a semiconductor laser as their pumping light source.

The solid laser can be efficiently pumped by coinciding the oscillation wavelength of the pumping source with the absorption wavelength of the solid laser medium. A semiconductor laser is more effective as a pumping source than either of the lamp sources because the wavelength purity of the semiconductor laser is much higher than that of the lamp light source. Furthermore, the pumping density can be made higher when a semiconductor laser is used as the pumping source, resulting in higher efficiency of the solid laser.

On the other hand, it is well known in the art that when using a xenon or krypton lamp as the pumping source, a slab laser can be applied to increase power. In the slab laser, the laser beam propagates in the medium in a zigzag mode, such that high power can be obtained with a small laser medium.

The semiconductor pumped solid laser has been disclosed by U.S. Pat. Nos. 3,624,545 and 4,720,940, Japanese Patent Applications (OPI) No. 189783/1987, 27079/1988, 27080/1988 and 140889/1985 (the term "OPI" as used herein means an "unexamined published application"), and IEEE Journal, June 1988, vol 24-6.

Of the above-described conventional solid lasers, small solid lasers have been disclosed in the Japanese Patent Applications (OPI) No. 189783/1987, 27079/1988 and 27080/1988. These solid lasers are pumped with one semiconductor laser (hereinafter referred to as "LD") and therefore suffer from the difficulty that injection of the pumping light beam cannot saturate the solid laser medium. Use of a high power LD to inject a pumping light beam of higher intensity would result in a higher output, however, the high power LD is expensive and has a short life.

Recently, an LD pumped solid laser has been disclosed which is miniaturized by coating the resonator mirror on the ends of the solid laser medium, however, it also suffers from the difficulties described above.

In the semiconductor pumped solid lasers disclosed in U.S. Pat. Nos. 3,624,545 and 4,710,940, the solid laser medium is pumped by a plurality of LDs, thus providing high power. In this case, since the laser medium itself also becomes large or is required to be made large, the injection of this pumping light beam connot saturate the laser medium, and it is difficult to pump the laser medium uniformly. Since the laser medium itself is large, the laser medium has the thermal distribution non-uniformly, with the result that the laser oscillation is unstable.

As described above, in the lamp pumped solid laser, a slab laser may be employed for high power. In this case, coating the resonator mirror of the laser medium is not practical and, accordingly, it is necessary to provide an external resonator mirror. As a result, the laser system is unavoidably bulky, and adjustment of the mirror is rather difficult.

The aforementioned IEEE, 1988, vol. 24-6 disclosed one example of a solid laser that utilized a coated resonator mirror in the laser medium. The solid laser may be pumped with a plurality of LDs; however, it is a ring laser, and the laser with a ring resonator is different from a laser forming a reciprocating optical path.

On the other hand, Japanese Patent Application (OPI) No. 140889/1985 has proposed a monocrystal fiber laser. This laser is disadvantageous in that it is expensive and difficult to manufacture. Also, it is difficult to inject the pumping light beam into the laser medium with high efficiency.

In view of the foregoing, an object of the present invention is an optically pumped solid laser that is small, but is high in output power.

Another object of the present invention is an optically pumped solid laser that is low in manufacturing cost, high in reliability, and long in life time.

SUMMARY OF THE INVENTION

The present invention is an optically pumped solid laser having a solid laser medium in the form of a prism. The prism can be in the form of, for example, a corner cube prism or a rectangular prism. The solid laser medium has a plurality of end faces through which a pumping light beam is applied to the solid laser medium, the pumping light beam being a semiconductor laser beam. At least one coating is formed on at least a part of an end face of the solid laser medium in the form of a prism, so that the end face acts as a resonator mirror or output mirror. The light input and output end of an optical fiber is connected to an end face of the solid laser medium, where the optical fiber is an output light providing optical fiber and/or a pumping light beam injecting optical fiber.

A non-linear crystal is coupled to a laser beam outputting end face of the solid laser medium, and is at least one selected from a group consisting of an SHG crystal, a THG crystal, an FHG crystal and a parametric crystal. A specific example is when the non-linear crystal is KTP, $\beta$-BaB$_2$O$_4$, KNbP$_3$ or MgO doped LiNbO$_3$. The non-linear crystal can also be in the form of a waveguide.

BRIEF DESCRIPTION OF THE DRAWINGS

The manner by which the above objects, and other objects, features, and advantages of the present invention are attained will be fully apparent from the following detailed description when it is considered in view of the drawings, wherein:

FIG. 14 is a front view showing the circular end face of a solid laser medium of the ninth embodiment;

FIG. 15 is a side view showing a tenth embodiment of the present invention;

FIG. 16 is a front view showing the circular end face of a solid laser medium of an eleventh embodiment of the present invention;

FIG. 17 is a side view showing a twelfth embodiment of the present invention;

FIG. 18 is a front view showing the circular end face of a solid laser medium of the twelfth embodiment;

FIG. 19 is a side view showing a thirteenth embodiment of the present invention;

FIG. 20 is a front view showing the circular end face of a solid laser medium of the thirteenth embodiment;

DETAILED DESCRIPTION OF THE PREFERRED EMBODIMENTS

Preferred embodiments of this invention will be described with reference to the accompanying drawings.

Figure 1:
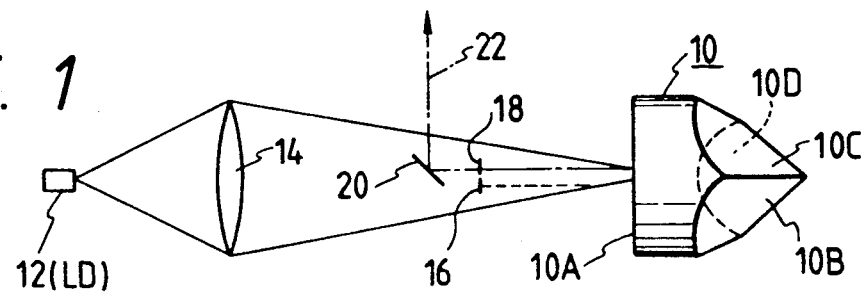
FIG. 1 is a side view showing an optically pumped solid laser according to a first embodiment of the present invention.

A first embodiment of the invention, shown in FIG. 1, comprises a solid laser medium 10 in the form of a corner cube prism, and an LD 12 (a semiconductor laser) as a pumping light source.

Figure 2:
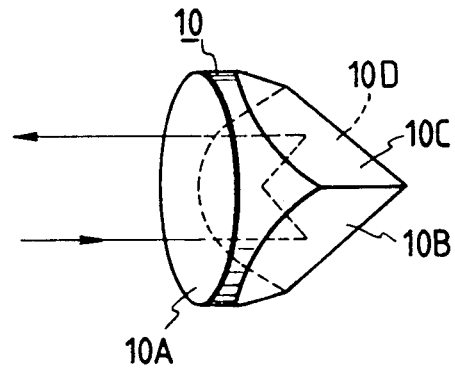
FIG. 2 is a perspective view showing a solid laser medium in the form of a corner cube prism of the first embodiment.

The corner cube prism is such that, as shown in FIG. 2, it has three end faces 10B, 10C, and 10D at one end which are perpendicular to one another. The other end face 10A is the circular end of a cylindrical section. A light beam incident to the circular end face 10A of the cylinder is reflected by the three end faces 10B, 10C, and 10D and then emerges from the circular end face 10A.

In the first embodiment, the pumping light beam emitted from the LD 12 is applied through a lens 14 to the circular end face 10A of the solid laser medium 10. The light beam generated in the solid laser medium 10 is subjected to total internal reflection by the three end faces 10B, 10C and 10D, and then is repeatedly reflected by a resonator mirror 16 and an output mirror 18, thus causing a laser oscillation.

The solid laser beam produced by resonance is applied through the output mirror 18 to a laser beam taking reflecting mirror 20, so that it is produced as an output light beam 22 extended sidewardly of the optical path. The resonator mirror 16 and the laser beam taking reflecting mirror 20 are designed to transmit the light of the wavelength of the LD 12 and to highly reflect the light of the wavelength of the solid laser. The output mirror 18 is designed to transmit the light of the wavelength of the LD 12, and to transmit a small amount of the solid laser beam.

In the first embodiment, the solid laser medium is in the form of a corner cube prism as described above. The solid laser beam is reflected by the three end faces 10B, 10C and 10D three times, caused to merge from the circular end face 10A, reciprocated and reflected by the resonance mirror 16. That is, there is a long optical path for oscillation in the solid laser medium 10, and the gain is increased proportionately.

Figure 3:
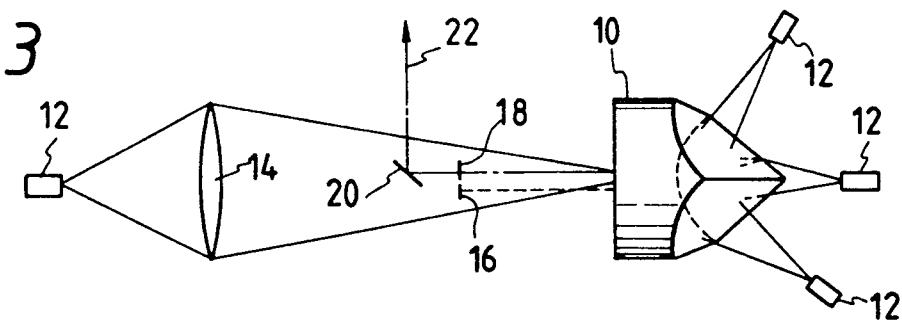
FIG. 3 is a side view showing a second embodiment of the present invention.

A second embodiment of the invention, described with reference to FIG. 3, includes additional LDs 12 that are used to inject pumping light beams to the end faces 10B, 10C, and 10D of the solid laser medium 10 In each of the first and second embodiments, an AR (antireflection) coating is formed on the circular end face 10A which shows anti-reflection with the light beams of the wavelengths of the LD 12 and the solid laser. In the second embodiment, the solid laser beam may leak out of the end faces 10B, 10C, and 10D. Therefore, it is preferable to form a laser light beam wavelength HR (high reflection) coating on each of the end faces 10B, 10C, and 10D. Note, however, that it is not always necessary to coat the three end faces 10B, 10C, and 10D to allow them to internally reflect light in the solid laser medium.

In the second embodiment, the laser beams are injected as the pumping light beam through the three end faces 10B, 10C, and 10D, thus providing high power. The LDs 12 may be small to allow the solid laser to be low in manufacturing cost, long in service life, and small in size.

Figure 4:
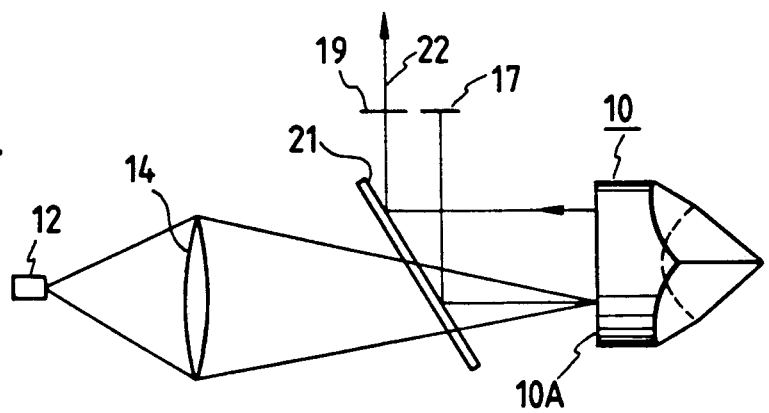
FIG. 4 is a side view showing a third embodiment of the present invention.

In the third embodiment, described with reference to FIG. 4, the pumping light beam emitted from the LD 12 is applied through the lens 14 and a dichroic mirror 21 to the circular end face 10A of the solid laser medium 10, and then the light beam generated in the solid laser medium 10 is internally reflected by the three end faces 10B, 10C, and 10D. The light beam thus reflected is reflected by the dichroic mirror 21 in a direction perpendicular to the optical axis of the lens 14. It is then reflected by a resonator mirror 17 positioned on the optical axis of the light beam thus reflected, so that it is applied through the dichroic mirror 21 and the circular end face 10A into the solid laser medium 10. The light beam thus applied is internally reflected by the three end faces 10B, 10C, and 10D, and then reflected by the dichroic mirror 21 so that it is applied to an output mirror 19. Thus, the light beam is repeatedly reflected by the output mirror 19 and the resonator mirror 17, thus causing a laser oscillation.

In the third embodiment, the dichroic mirror 21 is designed to transmit the light beam of the wavelength of the LD 12 at an incident angle of 45°, and highly reflect the light beam of the wavelength of the solid laser. The resonator mirror 17 is designed to totally internally reflect the light beam of the wavelength of the solid laser. In addition, the output mirror 19 is designed to reflect the light beam of the wavelength of the solid laser with only a small amount of transmittance.

In the third embodiment, as in the first and second embodiments, an AR coating is formed on the circular end face 10A in correspondence to the wavelengths of LD 12 and the solid laser. The dichroic mirror 21 is provided in the resonator of the solid laser medium 10 and, accordingly, it is unnecessary to provide the laser beam taking mirror. Adjustment of the resonator mirror 17 and the output mirror 19 can be achieved completely independently of the output light beam of the LD 12. In the first or second embodiment, adjustment of the resonator mirror 16 and the output mirror 18 slightly shifts the optical path of the output light beam of LD 12, such that it is difficult to adjust them. The third embodiment is free from such difficulty.

In the following embodiments of the present invention, as in the third embodiment, the dichroic mirror may be arranged in the resonator.

Figure 5:
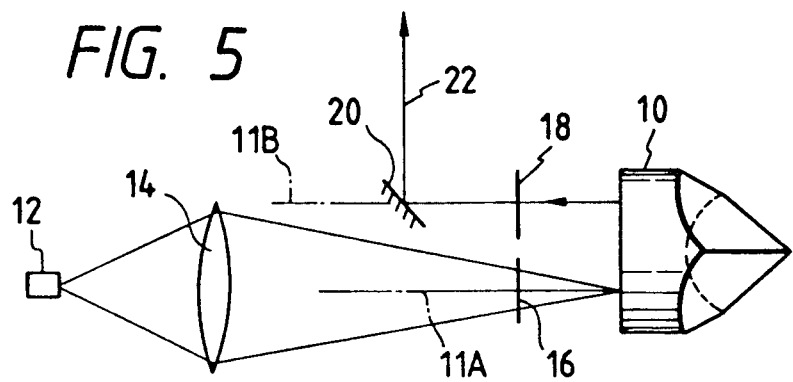
FIG. 5 is a side view showing a fourth embodiment of the present invention.

The fourth embodiment, described with reference to FIG. 5, is obtained as follows. The pumping light beam injecting optical axis 11A is shifted in parallel with the central optical axis of the solid laser medium 10. The resonator mirror 16 is disposed on the pumping light beam injecting optical axis 11A, and the output mirror 18 is positioned on the output light beam taking optical axis 11B. A laser beam taking reflecting mirror 20 is arranged on the output light beam taking optical axis 11B. It is preferable to form an AR coating on the circular end face 10A in correspondence to the wavelengths of the LD beam and the solid laser beam. In this embodiment, as in the first embodiment, the oscillation optical path length can be substantially long in the solid laser medium 10 and, accordingly, the gain can be increased proportionately.

Figure 6:
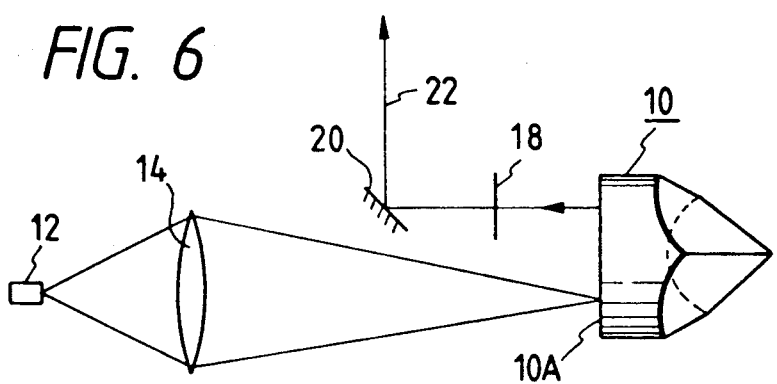
FIG. 6 is a side view showing a fifth embodiment of the present invention.
Figure 7:
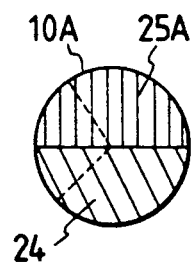
FIG. 7 is a front view showing the circular end face of a solid laser medium of the fifth embodiment.

The fifth embodiment, described with reference to FIGS. 6 and 7, is obtained by modifying the first embodiment as follows. A resonator total reflection mirror coating 24 is formed on one half of the circular end face 10A of the solid laser medium 10. The coating 24 transmits the light beam of the wavelength of the LD 12 and totally internally reflects the light beam of the wavelength of the solid laser medium; that is, it functions as a resonator total internal reflection mirror.

In the fifth embodiment, the pumping light beam emitted from the LD 12 is applied to the solid laser medium 10 through the half (lower half in FIG. 7) of the circular end face 10A, which is covered with the resonator total reflection mirror coating 24. The light beam generated by the pumping light beam thus applied resonates in the solid laser medium 10 with the coating 24 as the total internal reflection mirror of the resonator, and then merges, as an output light beam, from the upper half of the circular end face 10A.

It is desirable that an AR coating 25A is formed on the upper half of the circular end face 10A in correspondence to the wavelength of the solid laser beam. When compared with the first embodiment, the fifth embodiment is advantageous in that the total internal reflection resonator mirror can be eliminated.

Figure 8:
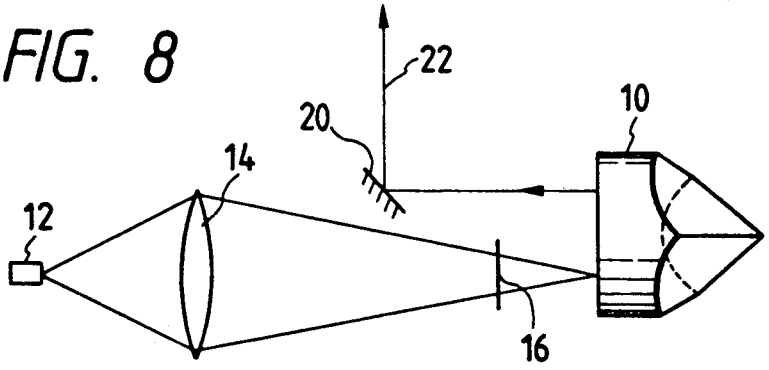
FIG. 8 is a side view showing a sixth embodiment of the present invention.
Figure 9:
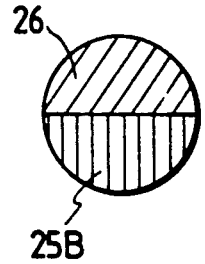
FIG. 9 is a front view showing the circular end face of a solid laser medium of the sixth embodiment.

The sixth embodiment, described with reference to FIGS. 8 and 9, is obtained as follows. An output mirror coating 26 is formed on the upper half of the circular end face 10A of the first embodiment. The coating 26 transmits a small amount of the light beam of the wavelength of the solid laser; that is, it functions as an output mirror. When compared with the first embodiment, the sixth embodiment is advantageous in that it needs no output mirror. It is preferable that an AR coating 25B be formed on the lower half of the circular end face 10A in correspondence to the wavelengths of the LD 12 and the solid laser.

Figure 10:
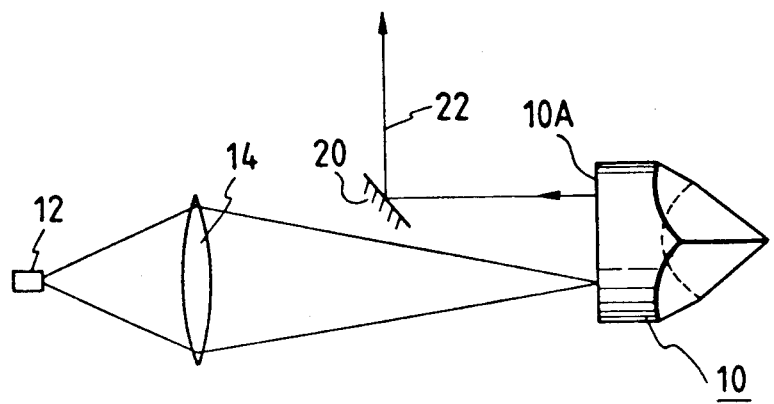
FIG. 10 is a side view showing a seventh embodiment of the present invention.
Figure 11:
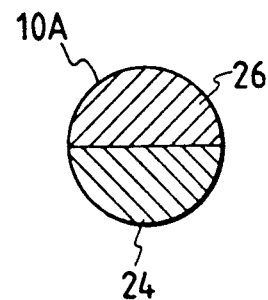
FIG. 11 is a front view showing the circular end face of a solid laser medium of the seventh embodiment.

In the seventh embodiment, described with reference to FIGS. 10 and 11, an output mirror coating 26, similar to that in the sixth embodiment, is formed on the upper half of the circular end face 10A. A resonator total reflection mirror coating 24 is formed on the lower half of the circular end face 10A that transmits the pumping light beam provided by the LD 12 and totally internally reflects the light beam of the solid laser; that is, it functions as a resonator total internal reflection mirror. The output mirror coating 26 formed on the upper half of the circular end face 10A transmits a small amount of the light beam of the solid laser. In other words, the lower-half coating functions as a resonator total internal reflecting mirror, while the upper-half coating functions as an output mirror. The seventh embodiment is advantageous in that it needs neither the resonator mirror nor the output mirror and, accordingly, adjustment of those mirrors is not required.

Figure 12:
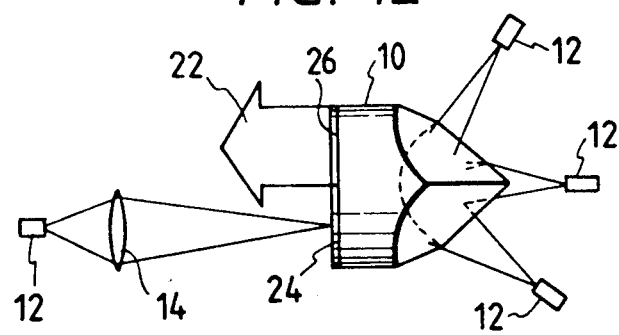
FIG. 12 is a side view showing an eighth embodiment of the present invention.

The eighth embodiment, described with reference to FIG. 12, is similar to the seventh embodiment shown in FIGS. 10 and 11. An output mirror coating 26 and a resonator total reflection mirror coating 24 are formed on the upper half and the lower half of the circular end face 10A, respectively, so that they function as an output mirror and a resonator mirror, respectively. The lens 14 in FIG. 12 is shifted down so that it does not intercept the output light beam 22 that emerges from the upper half of the circular end face. Accordingly, the output light beam can be obtained without use of the laser beam taking reflecting mirror.

Figure 13:
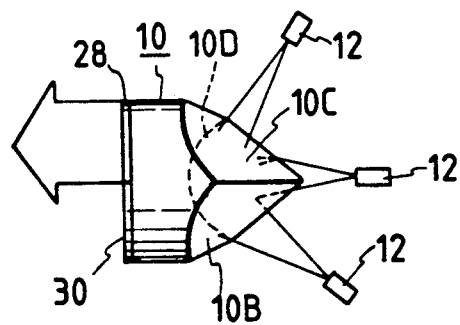
FIG. 13 is a side view showing a ninth embodiment of the present invention.

In the ninth embodiment, described with reference to FIGS. 13 and 14, a coating 28, which totally internally reflects the pumping light beam emitted by the LD 12 and transmits a small amount of the light beam of the solid laser, is formed on the upper half of the solid laser medium 10. A total internally reflection resonator mirror coating 30, which totally reflects both the light beam of the solid laser and the pumping light beam output by the LD 12, is formed on the lower half of the circular end face 10A of the solid laser medium 10. The pumping light beam is not applied to the circular end face 10 but rather the LDs 12 apply the pumping light beams to the end faces 10B, 10C, and 10D of the solid laser medium 10. The pumping light beams applied to the three end faces 10B, 10C, and 10D by the LDs 12 are sufficiently confined between the circular end face 10A and the three end faces 10B, 10C, and 10D of the solid laser medium 10.

Accordingly, in the ninth embodiment, it is unnecessary to use the resonator mirror, the output mirror, or the laser beam taking reflecting mirror, making adjustment of these mirrors unnecessary.

In the tenth embodiment, described with reference to FIG. 15, a resonator and output mirror coating 32, which totally reflects the pumping light beam of the LD 12 and transmits a small amount of the output light beam of the solid laser medium 10, is formed on the entire circular end face 10A of the solid laser medium 10. Similarly, as in the ninth embodiment, the LDs 12 apply the pumping light beams to the three end faces 10B, 10C, and 10D. The pumping light beams injected into the solid laser medium 10 through the end faces 10B, 10C, and 10D are well confined in the solid laser medium 10 and reflected, in a resonance mode, between the resonator and output mirror coating 32 and the end faces 10B, 10C, and 10D, so as to be output as an output light beam through the entire circular end face 10A.

Accordingly, it is unnecessary to use the resonator mirror, the output mirror, or the laser beam taking reflecting mirror. It is also unnecesary to form different coatings on the circular end face 10A; i.e., one coating is sufficient, making the tenth embodiment more easily manufactured.

In the eleventh embodiment, described with reference to FIG. 16, an output mirror coating 34 in the form of a beam spot, and a resonator mirror coating in the form of a sector having a central angle of about 120°, are formed on the circular end face 10A of the solid laser medium 10. This is advantageous in that a laser beam in a desired form can be outputted, and it is unnecessary to use the resonator mirror, the output mirror, or the laser beam taking reflecting mirror. This embodiment may be modified so that the output mirror coating 34 is in the form of a sector, and the resonator mirror coating 36 is in the form of a beam spot. The output mirror coating and the resonator mirror coating may be formed according to the configuration of the output laser beam.

In the twelfth embodiment, described with reference to FIGS. 17 and 18, the LDs 12 inject pumping light beams into the solid laser medium 10 through its three end faces 10B, 10C, and 10D. The total reflection resonator mirror coating is formed on the lower half of the circular end face 10A of the solid laser medium 10, while three small circle shaped output mirror coatings 34 are formed on the upper half of the circular end face 10A. This is advantageous in that it can provide a plurality of output light beams at the same time.

In the thirteenth embodiment, described with reference to FIGS. 19 and 20, the LDs 12 inject their pumping light beams into the solid laser medium 10 through the three end faces 10B, 10C, and 10D, and an optical fiber 38 is connected to the center of the circular end face 10A to output the laser beam. The solid laser beam output mirror coating may be applied to the coupling end of the optical fiber, which is connected to the solid laser medium 10, or to the other end of the optical fiber. In the latter case, at the coupling region of the laser medium 10 and the optical fiber 38, it is preferable that an AR coating be formed on both the laser medium 10 and the optical fiber 38. The embodiment is formed by connecting the optical fiber 38 to the flat circular end face 10A of the solid laser medium 10, as described above, allowing it to be readily manufactured at low cost.

Figure 21:
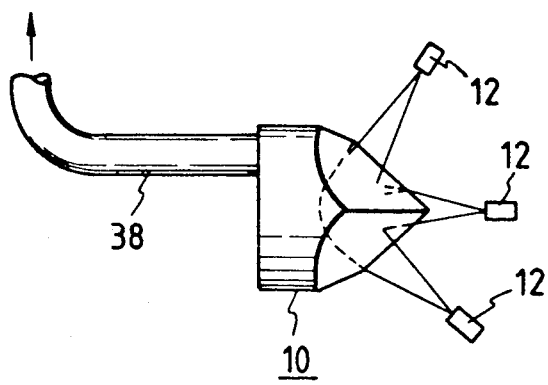
FIG. 21 is a side view showing a fourteenth embodiment of the present invention.

In the fourteenth embodiment, described with reference to FIGS. 21 and 22, the total reflection resonator mirror coating 30 is formed on the circular end face 10A of the solid laser medium 10 in the form of a sector having a central angle of 120°, and the optical fiber 38 is connected to the remaining region of the circular end face 10A. The LDs 12 inject the pumping light beams into the solid laser medium 10 through the three end faces 10B, 10C and 10D. The total reflection resonator mirror coating 30 in the form of a sector is formed in such a manner that it is in alignment with one of the three end faces 10B, 10C, or 10D.

Figure 22:
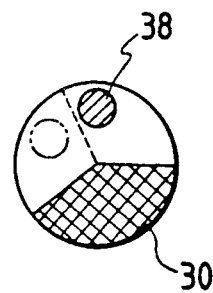
FIG. 22 is a front view showing the circular end face of a solid laser medium of the fourteenth embodiment.

Accordingly, when it is required to connect a plurality of optical fibers 38 to the circular end face 10A, they should be connected to the regions of the circular end face which are within the projections of the remaining end faces of the circular end face as indicated by the two-dot chain line in FIG. 22. The solid laser beam output mirror coating may be applied to the coupling end of the optical fiber 38 which is connected to the solid laser medium 10, or to the other end of the optical fiber 38. In the latter case, it is preferable that an AR coating be formed on both the laser medium 10 and the optical fiber 38 at the coupling region.

Figure 23:
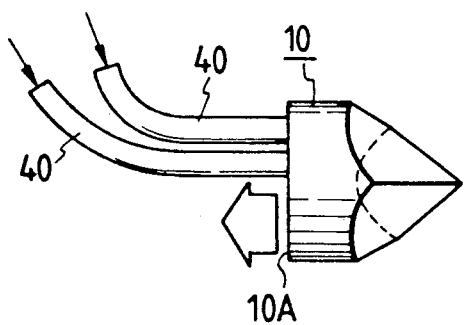
FIGS. 23 through 32 are side views showing fifteenth through twenty-fourth embodiments of the invention, respectively.

In thirteenth and fourteenth embodiments, the optical fiber 38 is connected to the solid laser medium 10 to provide the output light beam; however, it may be connected to the solid laser medium 10 to inject the pumping light beams into the laser medium 10. In a fifteenth embodiment shown in FIG. 23, two pumping light beam injecting optical fibers 40 are connected to a part of the circular end face 10A of the solid laser medium 10, and the other part of the circular end face is utilized for providing the output light beam. The total reflection resonator mirror coatings, which sufficiently transmits the pumping light beams, are formed on either ends of the pumping light beam injecting optical fibers 40 which are connected to the solid laser medium 10. The output mirror coating is formed on the remaining region of the circular end face 10A which is not part of the coupling region.

Figure 24:
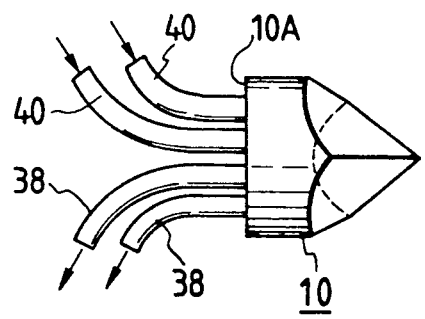

In the sixteenth embodiment, described with reference to FIG. 24, the pumping light beams are applied through the optical fibers 40 to the laser medium 10, and the output light beams of the laser medium 10 are obtained through the optical fibers 38. When compared with the previous embodiments, this one is advantageous in that high power pumping light beams can be injected into the laser medium. The solid laser beam output mirror coating may be applied to the coupling ends of the optical fibers 38 and then connected to the solid laser medium 10. The total reflection resonator mirror coating, which transmits the pumping light beam, may be applied to the coupling ends of the optical fibers 40 and then connected to the laser medium 10.

Figure 25:
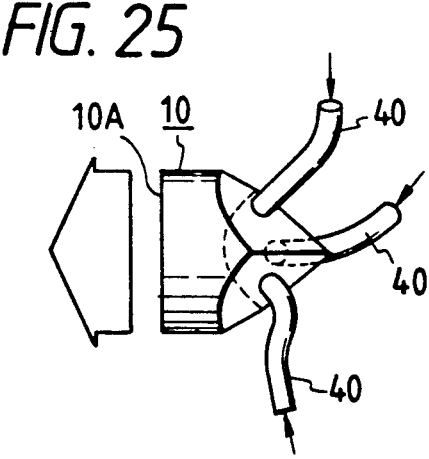

In the seventeenth embodiment, described with reference to FIG. 25, three optical fibers 40 are connected to the three end faces 10B, 10C, and 10D of the solid laser medium 10 so that the pumping light beam is injected into the solid laser medium 10 through a part of all of the three end faces 10B, 10C, and 10D of the solid laser medium 10. The output mirror coating is formed on the circular end face 10A of the solid laser medium 10. Instead of forming an output mirror coating, the output beam taking optical fibers 38 may be connected to the circular end face 10A.

Figure 26:
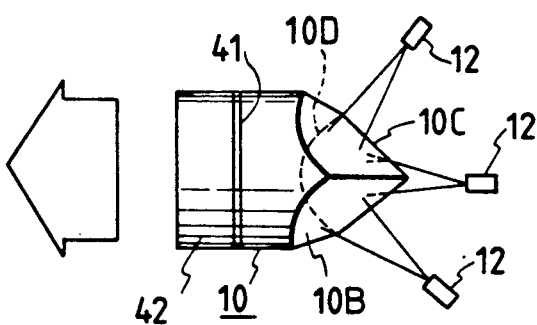

In the eighteenth embodiment, described with reference to FIG. 26, a second harmonic wave generating crystal which is a kind of non-linear crystal, namely an SHG (Second Harmonic Generation) crystal 42, is connected through a solid laser beam output mirror coating 41 to the circular end face 10A of the solid laser medium 10. The LDs 12 inject the pumping light beams into the solid laser medium 10 through the three end faces 10B, 10C, and 10D.

In the case where the solid laser medium 10 is of Nd: YAG (Yttrium Aluminum Garnet doped with Neodymium), two different output light beams, 1.06 μm (micrometers) and 532 nm (nanometers), are provided through the SHG crystal 42. The light beam 532 nm in wavelength is the SHG light beam.

This embodiment is advantageous in that a solid laser for outputting visible, and infrared rays can be readily formed, and no mirror adjustment is required.

Figure 27:
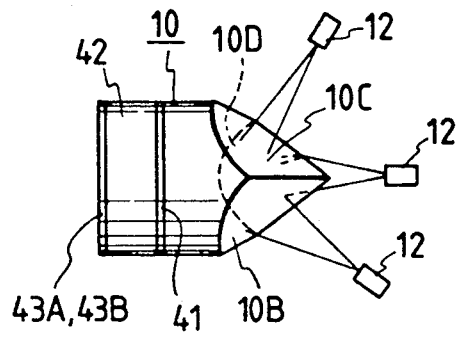

A nineteenth embodiment of the invention, described with reference to FIG. 27, is similar to the eighteenth embodiment shown in FIG. 26, in that an SHG crystal 42 is employed. An AR coating or a total internal reflection mirror coating is formed between one end face of the SHG crystal 42 and the circular end face 10A of the solid laser medium 10. A solid laser beam resonator mirror and output mirror coating 43A and an SHG beam transmitting coating 43B are formed on the other end face of the SHG crystal 42. If, in this case, the solid laser medium 10 is YAG, output beams 1.06 μm and 532 nm (SHG beam) in wavelength are produced. In the case where a solid laser total reflection mirror coating and an SHG beam transmitting coating 43B are formed on the other end face of the SHG crystal 42 and the solid laser medium 10 is YAG, only the SHG beam 532 nm in wavelength is output.

Figure 28:
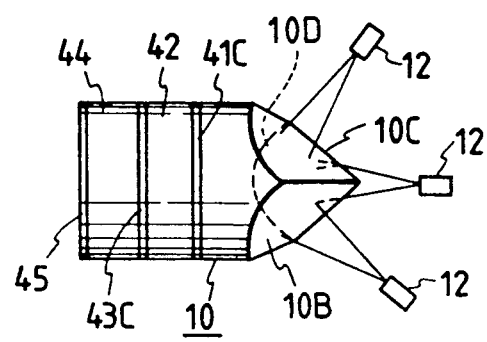

The twentieth embodiment, described with reference to FIG. 28, is obtained by connecting a THG (Third Harmonic Generation) crystal 44, which produces a third harmonic wave, to the other end face of the SHG crystal 42 shown in FIG. 26 or 27. This end face is opposite to the one end face of the SHG crystal 42 to which the solid laser medium 10 is connected. If the solid laser medium 10 is YAG, a coating 41C, which transmits a light beam of 1.06 μm and highly reflects a light beam of 532 nm (or SHG beam), is formed between the SHG crystal 42 and the solid laser medium 10. A coating 43C is formed between the SHG crystal 42 and the THG crystal 44, which transmits a light beam of 1.06 μm and a light beam of 532 nm (SHG beam) and highly reflects a light beam of 355 nm (THG beam). Finally, a coating 45, which highly reflects a light beam of 1.06 μm and a light beam of 532 nm and transmits a light beam of 355 nm, is formed on the other end face of the THG crystal 44 which is opposite to the end face where the SHG crystal 42 is provided. In response to the output pumping light beams of the LDs 12 injected into the solid laser medium 10 through the end faces 10B, 10C and 10D, the SHG crystal 42 produces a 1.06 μm light beam and an SHG light beam resulting in the THG crystal 44 outputting a THG light beam through its end face.

Figure 29:
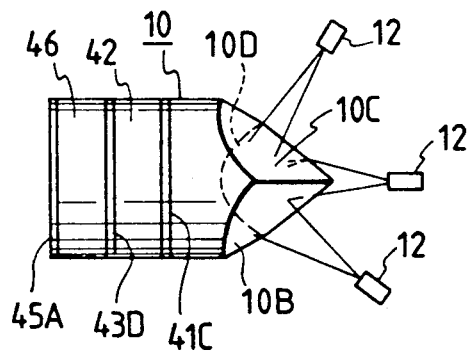

In the twenty-first embodiment, described with reference to FIG. 29, an FHG (Fourth Harmonic Generation) crystal 46, which generates a fourth harmonic wave, and an SHG crystal 42 are arranged on the side of the circular end face 10A of the solid laser medium 10. A coating 41C, which transmits a 1.06 μm light beam and highly reflects a 532 nm light beam (SHG beam), is formed on the circular end face 10A or the one end face of the SHG crystal 42 which confronts the circular end face 10A. A coating 43D, which highly reflects a 1.06 μm light beam and a 266 nm light beam (FHG beam) and transmits a 532 nm light beam (SHG beam), is formed on the one end face of the FHG crystal 46 which confronts with the SHG crystal 42. Finally, a coating 45A, which highly reflects an SHG light beam and transmits an FHG light beam, is formed on the other end face of the FHG crystal 46. The solid laser medium 10 is YAG, as in the twentieth embodiment.

The LDs 12 inject pumping light beams into the solid laser medium 10 through the end faces 10B, 10C and 10D, producing a laser beam of 1.06 μm. The laser beam thus produced is applied to the SHG crystal 42, where a 1.06 μm light beam and an SHG light beam are generated, but only the SHG light beam is injected into the FHG crystal 46. In the FHG crystal, a laser beam is produced in response to the SHG light beam thus injected. Of the laser beam thus produced, only the FHG light beam passing through the coating 45A is output.

Figure 30:
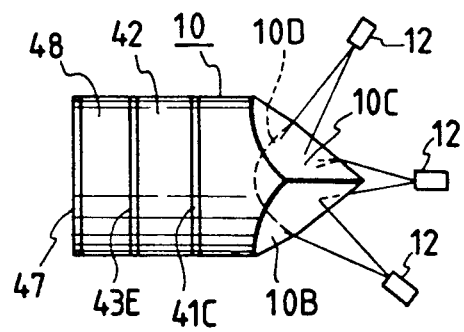

In the twenty-second embodiment, described with reference to FIG. 30, an SHG crystal 42 and a parametric crystal 48 are arranged on the side of the circular end face of the solid laser medium 10 of YAG. A coating, which transmits a 1.06 μm light beam and highly reflects a 532 nm light beam (SHG light beam), is formed on the circular end face 10A or the one end face of the SHG crystal which confronts the circular end face 10A. A coating 43E, which highly reflects a 1.06 μm light beam and a parametric light beam that transmits an SHG light beam, is formed on the other end face of the SHG crystal 42 or the one end face of the parametric crystal 48 which confronts with the SHG crystal 42. Finally, a coating 47 which highly reflects an SHG light beam and transmits a parametric light beam is formed on the other end face of the parametric crystal 48.

The parametric light beam output through the end face of the parametric crystal 48 has a wavelength of 2×532 nm. The parametric crystal 48 is shown combined with the SHG crystal 42, but it may be combined with the THG crystal 44 or FHG crystal 46, or it may be coupled directly to the circular end face 10A of the solid laser medium.

In the case where the parametric crystal 48 is combined with the THG crystal 44, the output parametric light beam is about 2×355 nm in wavelength. Where the parametric crystal 48 is combined with the FHG crystal 46, the output parametric light beam is about 2×266 nm in wavelength. Where the parametric crystal 48 is coupled to the circular end face 10A of the solid laser medium 10, the output parametric light beam is about 2×1.06 μm in wavelength. The coatings may be modified so that a plurality of light beams such as a 1.06 μm light beam and a THG light beam are output at the same time.

Figure 31:
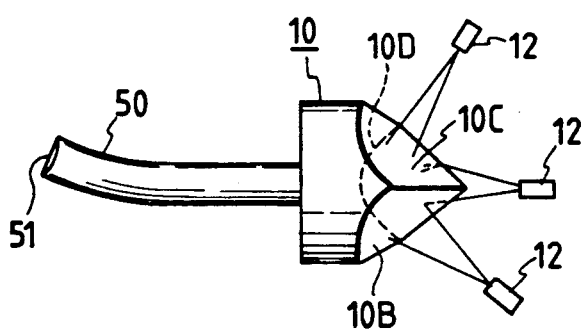

In the twenty-third embodiment, described with reference to FIG. 31, an optical fiber shaped, non-linear crystal 50 is connected, as an SHG element, to the circular end face 10A of the solid laser medium 10. The optical fiber shaped, non-linear crystal 50 is, for instance, of MgO doped LiNbO$_3$. The solid laser medium 10 is, for instance, YAG. An AR coating for the light beam of 1.06 μm and an HR coating for the light beam of 532 nm is formed on the circular end face 10A or on the one end of the non-linear crystal 50, which is coupled to the circular end face 10A. A coating 51, which highly reflects a 1.06 μm light beam and transmits a 532 nm light beam, is formed on the other end of the non-linear crystal 50. The pumping light beams are injected by the LDs 12 into the solid laser medium 10 through the end faces 10B, 10C and 10D. The pumping light beam resonates between the coating 51 and the end faces 10B, 10C, and 10D, so that an SHG light beam is output through the end of the optical fiber shaped, non-linear crystal 50.

Figure 32:
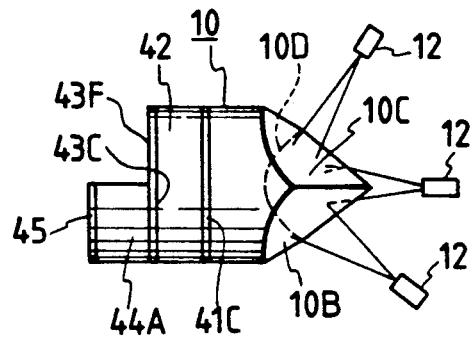
Figure 33:
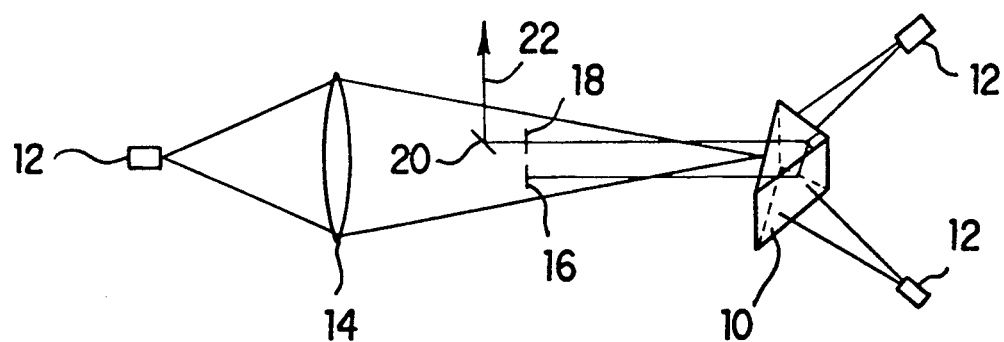
FIG. 33 is a side view of a rectangular prism of the present invention.

A twenty-fourth embodiment of the invention, described with reference to FIG. 32, uses an SHG crystal 42 that is coupled to the circular end face of the solid laser medium 10 of YAG, and a semicircular THG crystal 44A that is coupled to the SHG crystal 42. A coating 41C, which transmits a 1.06 μm light beam and highly reflects an SHG light beam, is formed on the circular end face 10A or on the one end face of the SHG crystal 42 which confronts with the circular end face 10A. A coating 43F, which highly reflects a 1.06 μm light beam and transmits an SHG light beam, is formed on the upper semicircular half of the end face of the SHG crystal which is not in contact with the THG crystal 44A. A coating 43C is formed on the lower semicircular half which transmits both a 1.06 μm light beam and an SHG light beam and highly reflects a THG light beam. Finally, a coating, which highly reflects both a 1.06 μm light beam and an SHG light beam and transmits a THG light beam, is formed on the other end face of the semicircular THG crystal 44A. An SHG light beam is output through the end face of the SHG crystal 42 which is not connected to the THG crystal 44A, and a THG light beam is output through the end face of the THG crystal crystal 44. That is, output light beams different in wavelength can be obtained by using different optical crystals.

As is apparent from the above description, output light beams different in wavelength can be obtained by combining the SHG crystal 42, THG crystal 44 or 44A, FHG crystal 46, parametric crystal 48 and optical-fiber-shaped non-linear crystal 50 in various manners, or by changing their sectional configurations. With a plurality of optical fiber shaped, non-linear crystals 50, output light beams different in wavelength can be obtained from them.

As described above, lasers small in size and able to provide visible, ultraviolet and infrared rays can be readily formed by suitably combining the SHG crystal 42, THG crystals 44 and 44A, FHG crystal 46, parametric crystal and/or optical fiber shaped non-linear crystal 50. The lasers thus formed are advantageous in that they need no mirror adjustment.

In the above-described embodiments, the solid laser medium 10 is a cylinder having one end portion with three end faces which are perpendicular to one another; that is, it is in the form of a corner cube prism. The invention, however, is not limited thereto or thereby. The solid laser medium may take the shape of any prism; for instance, a rectangular prism.

In the above-described embodiments, the pumping light beams injected into the solid laser medium 10 are formed by the LDs 12; however, the invention is not limited thereto or thereby. That is, the invention covers a so-called "lamp pumped solid laser" which employs a pumping light source with, for example, a xenon lamp or krypton lamp.

Furthermore in the above-described embodiments, the pumping light beam is injected into the solid laser medium 10 through the circular end face 10A and/or three end faces 10B, 10C, and 10D. However, it should be noted that the invention covers the cases where, in the pumping light beam injection, one or two of the three end faces are used, or the circular end face is used in combination with them.

In the above-described embodiments, the non-linear crystal may be one or some of the SHG crystal, THG crystal, FHG crystal and parameteric crystal. It is preferable that the non-linear crystal is KPT (Potassium Titanyl Phosphate), $\beta$-BaB$_2$O$_4$, KNbO$_3$ or MgO doped LiNbO$_3$.

The optical fiber shaped non-linear crystal should be in the form of a waveguide.

What is claimed is:

1. A solid laser medium for an optically pumped laser comprising:
    a solid laser medium having the form of a corner cube prism with a plurality of end faces, at least one of said end faces being adapted to receive a pumping light beam applied to the solid laser medium;
    means for providing said pumping light beam to said solid laser medium; and
    means for providing an output laser beam from said solid laser medium;
    wherein the pumping light beam is generated by a semiconductor laser; and
    wherein said solid laser medium with said plurality of end faces has at least one coating formed on at least a part of at least one of said end faces such that said end face acts as one of a resonator mirror and an output mirror.

2. A solid laser medium according to claim 1, further including an optical fiber connected to one of said end faces, said optical fiber adapted to receive the pumping light beam to be applied to the solid laser medium.

3. A solid laser medium according to claim 1, further including an optical fiber connected to one of said end faces, said optical fiber adapted to receive the output light beam to be applied from the solid laser medium.

4. A solid laser medium according to claim 1, wherein at least one of said end faces abuts a nonlinear crystal adapted to receive the output light beam to be applied from the solid laser medium.

5. A solid laser medium according to claim 4, wherein said non-linear crystal comprises at least one selected from a group comprising an SHG crystal, a THG crystal, an FHG crystal, and a parametric crystal.

6. A solid laser medium according to claim 4, wherein the non-linear crystal comprises one of KTP, $\beta$-BaB$_2$O$_4$, KnbP$_3$, and MgO doped LiNbO$_3$.

7. A solid laser medium according to claim 4, wherein the non-linear crystal is in the form of a waveguide.

8. A solid laser medium for an optically pumped laser comprising:
    a solid laser medium having the form of a rectangular prism with a plurality of end faces, at least one of said end faces being adapted to receive a pumping light beam applied to the solid laser medium;
    means for providing said pumping light beam to said solid laser medium; and
    means for providing an output laser beam from said solid laser medium;
    wherein the pumping light beam is generated by a semiconductor laser; and
    wherein said solid laser medium with said plurality of end faces has at least one coating formed on at least a part of at least one of said end faces such that said end faces acts as one of a resonator mirror and an output mirror.

* * * * *

UNITED STATES PATENT AND TRADEMARK OFFICE
CERTIFICATE OF CORRECTION

PATENT NO. : 5,121,404
DATED : June 09, 1992
INVENTOR(S) : Shinichiro AOSHIMA et al.

It is certified that error appears in the above-identified patent and that said Letters Patent is hereby corrected as shown below:

On the title page,
Abstract, line 12, change "parameteric" to --parametric--.

Claim 6, column 12, line 36, change "KnbP$_3$" to --KNbP$_3$--.

Claim 8, column 12, line 54, before "acts" change "faces" to --face--.

Signed and Sealed this

Twelfth Day of October, 1993

Attest:

BRUCE LEHMAN

*Attesting Officer*     *Commissioner of Patents and Trademarks*